Jan. 26, 1965  D. R. KERR  3,167,319
SAND SPREADING MECHANISM WITH REVERSIBLE CONVEYOR
Filed May 16, 1961  5 Sheets-Sheet 1

INVENTOR.
DONALD R. KERR
BY
ATTORNEY

Jan. 26, 1965  D. R. KERR  3,167,319
SAND SPREADING MECHANISM WITH REVERSIBLE CONVEYOR
Filed May 16, 1961  5 Sheets-Sheet 3
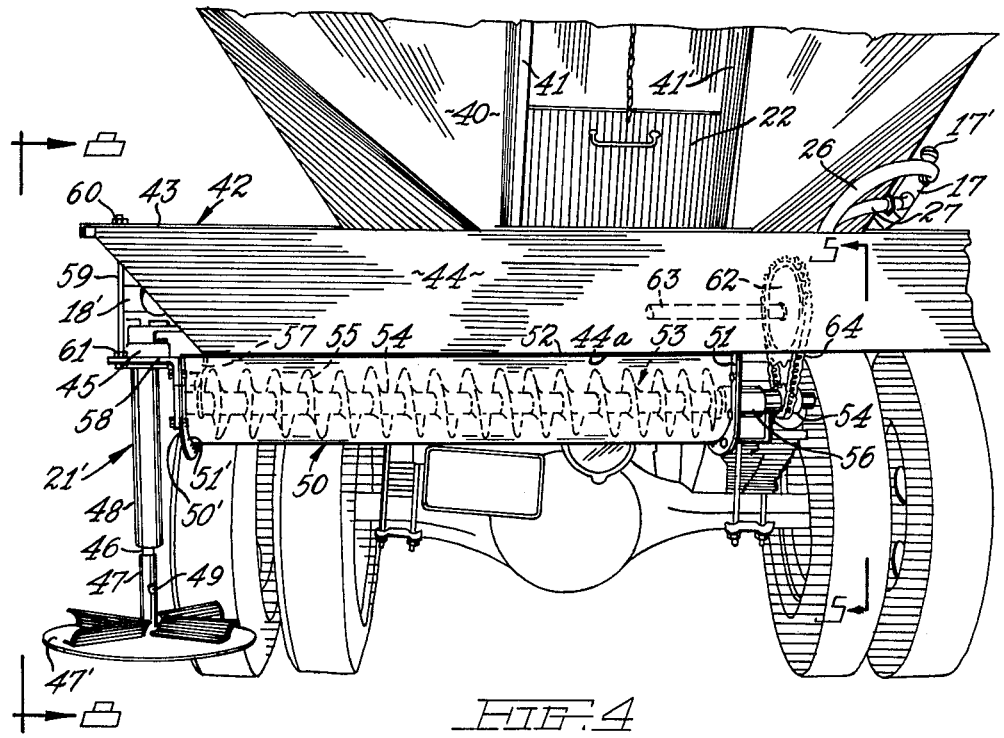
FIG. 4
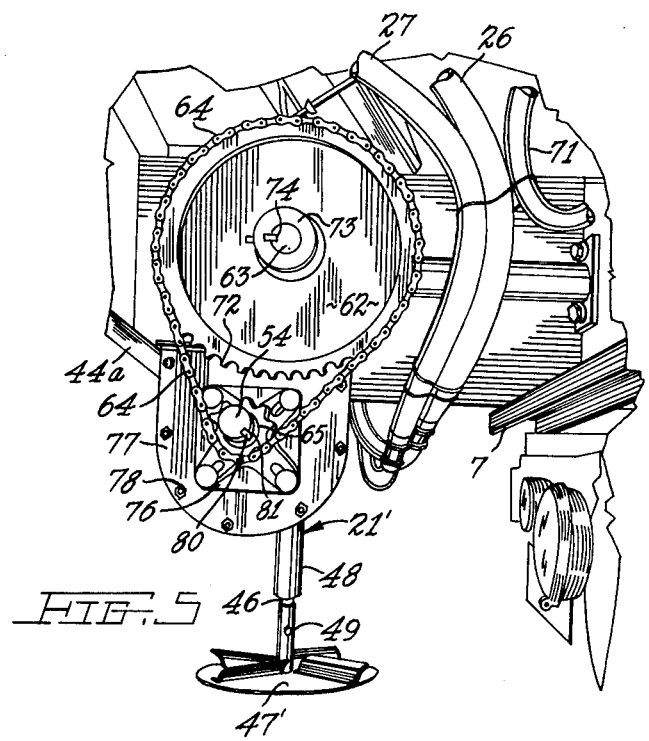
FIG. 5
INVENTOR.
DONALD R. KERR
BY
ATTORNEY

INVENTOR.
DONALD R. KERR
BY
ATTORNEY

Jan. 26, 1965 D. R. KERR 3,167,319
SAND SPREADING MECHANISM WITH REVERSIBLE CONVEYOR
Filed May 16, 1961 5 Sheets-Sheet 5

INVENTOR.
DONALD R. KERR
BY
ATTORNEY

United States Patent Office 3,167,319
Patented Jan. 26, 1965

3,167,319
SAND SPREADING MECHANISM WITH
REVERSIBLE CONVEYOR
Donald R. Kerr, Bucyrus, Ohio, assignor to
Anthony J. Torrey, Framingham, Mass.
Filed May 16, 1961, Ser. No. 110,473
3 Claims. (Cl. 275—8)

My invention relates to improvements in motor actuated material spreading mechanism for road construction and maintenance purposes and relates more particularly to improvements in spreading mechanism of the type set forth, described and claimed in copending application for United States Letters Patent, S.N. 777,111, filed November 28, 1958, for which United States Letters Patent No. 2,988,368 were granted June 13, 1961.

The improved mechanism of my invention involves the operation of additional road working tools and is adapted to be driven by mechanism illustrated in the aforesaid application and includes means adapted to be alternately employed by adaptation of power existent in the previous mechanism.

The improvement involved in the present invention includes the provision of a forward sanding or material dispensing operation plus a rearward operation of the same general type without removal or transfer of any mechanism existing in the prior construction with which this improved mechanism is used. It is therefore possible by the use of my improved invention to attain a more flexible and efficient sand spreading operation.

A further object of my invention is to accomplish the purposes hereof without the addition of a further source of power.

A further object is to attain a variety in positioning and operation of spreading at the rear of the truck by providing means whereby selective mounting of the additional means provided at the rear portion of the truck is secured.

A still further object is to provide improved conveyance means for the material to be spread from a reversible main conveyor.

A further object is to provide improved material conveyance means to be used with the additional rear mounted, material dispenser of the invention when the latter is mounted on the left or right rear portion of the truck.

It is a further object to drive the improved conveyance means through existing power means.

These and other objects of my invention will become more apparent by reference to the accompanying drawings illustrating the invention in which:

FIG. 4 is a rear view of a modified form of my improved spreading mechanism;

FIG. 5 is an enlarged side elevational, taken on line 5—5 of FIG. 4 and showing more clearly the manner in which the helicoid flight conveyor of the modified form is driven;

Figure 1:
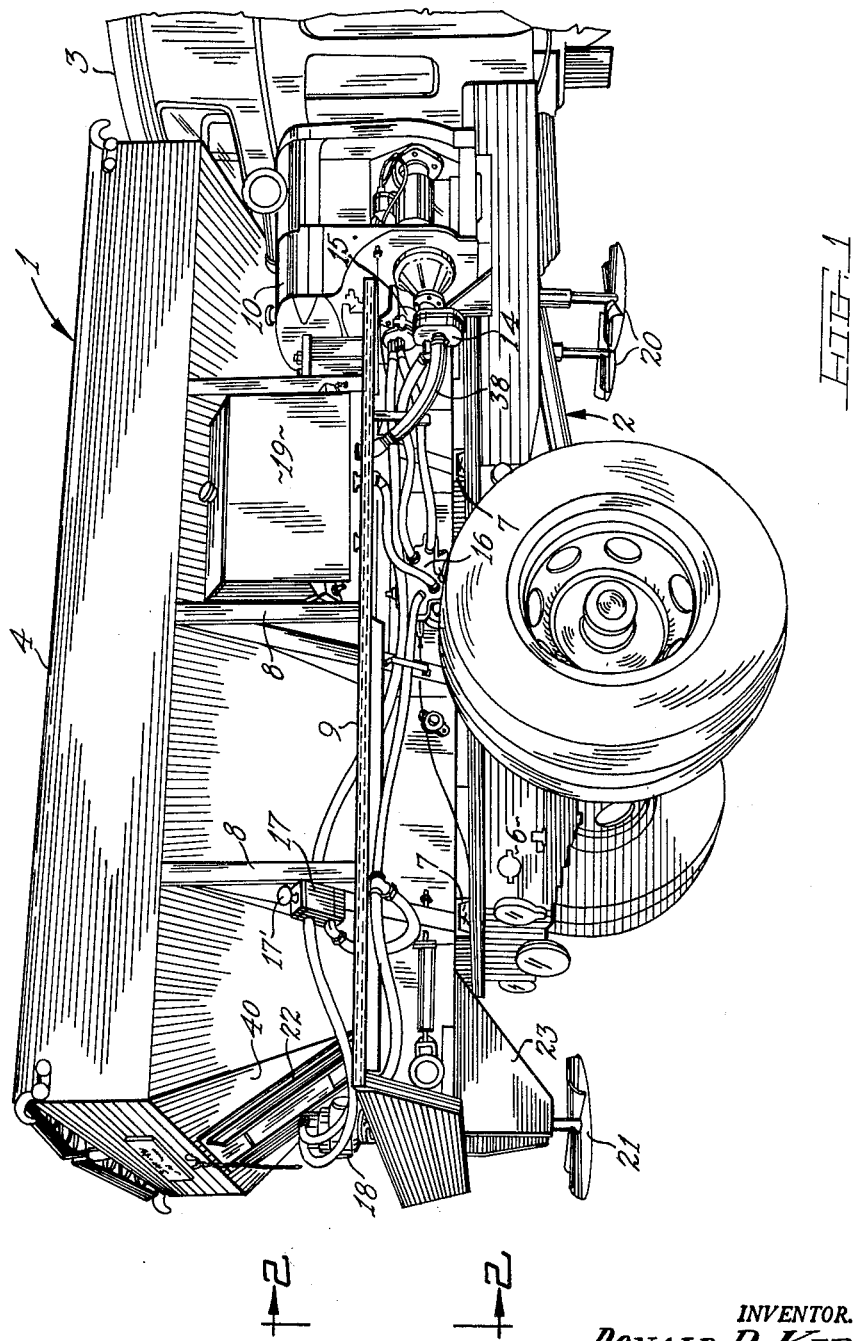
FIG. 1 is a side elevation of a conventional truck with my improved sand spreading device mounted thereon.
Figure 3:
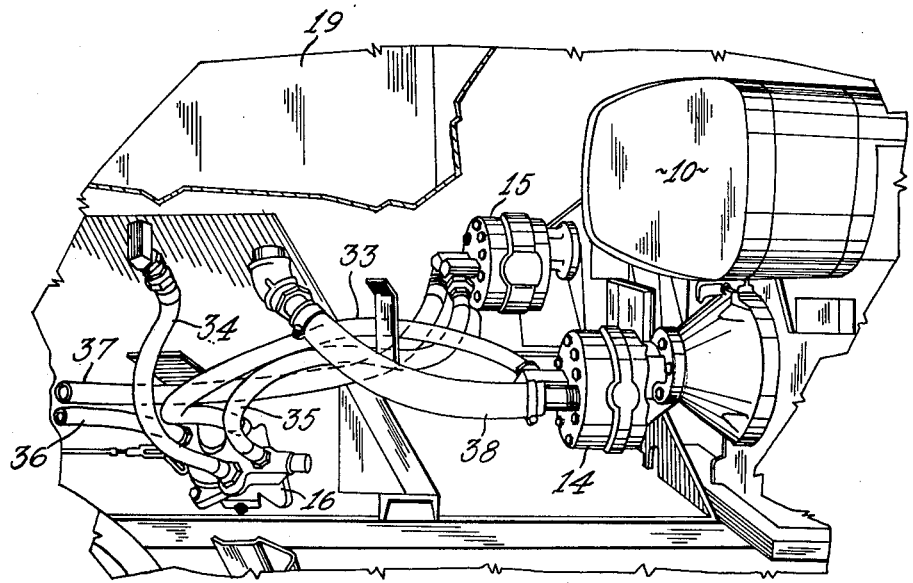
FIG. 3 is an enlarged side elevation view of a portion of the hydraulic system.
Figure 6:
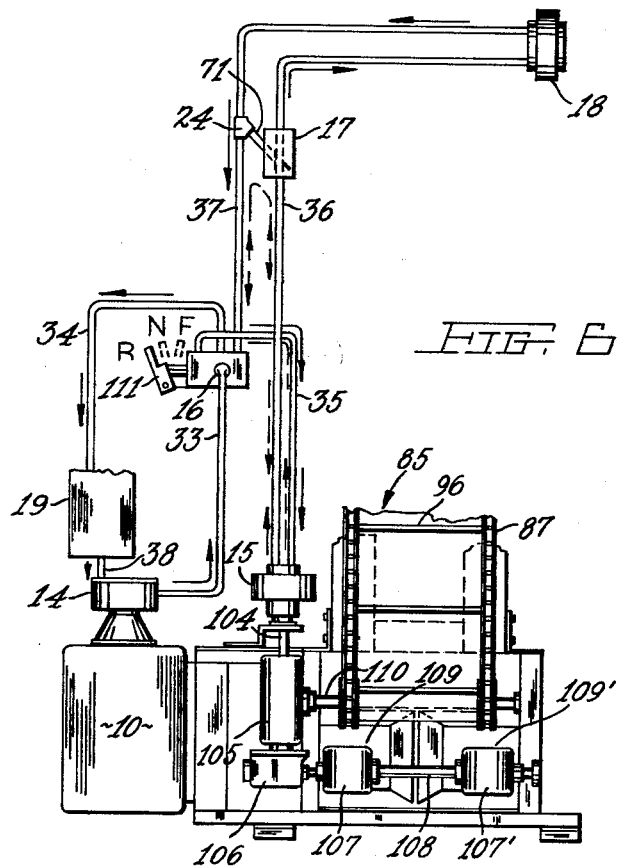
FIG. 6 is a diagrammatic plan view of my improved spreading mechanism and shows the flow diagram of the hydraulic system employed.

Referring now to the drawings in which like parts are designated by like reference characters and particularly to FIG. 1, the spreading mechanism of my invention is generally indicated at 1 and is mounted on a conventional truck frame, generally indicated at 2. The truck with the spreading device mounted thereon is driven from cab 3 in a conventional manner. The sand spreading device comprises a hopper 4 preferably having downwardly converging sidewalls 5 and a downwardly converging end wall 40. The hopper 4 is mounted on parallel longitudinal frame members 6 through the media of transversely extending channel-shaped members 7. It will be understood that the spreading device can be secured to members 6 in any suitable manner such as, e.g., bolts. Vertical brace members 8 are preferably welded or otherwise suitably secured to the converging side walls 5 and provide rigidity and support to said sidewalls and, as shown, brace members 8 terminate adjacent horizontal ledge portion 9. Hopper 4 is adapted to contain sand or the like material for road construction or road treating purposes. The hopper 4 is open at the bottom thereof and a longitudinally positioned conveyor 85, FIG. 6, is provided immediately below the bottom thereof for moving the sand either forwardly or rearwardly, as will be more fully explained hereinafter. The spreading device of my invention is preferably powered by a gasoline engine 10, preferably independent of the engine means for propelling said vehicle. Engine 10 is mounted at the front portion of the spreading device 1, although it will become readily apparent that it could be located elsewhere without impairing the operation thereof. Engine 10 is adapted to drive a hydraulic pump 14 which is mounted directly to said engine, as shown in FIGS. 1 and 3. The hydraulic pump 14 is supplied with hydraulic fluid from a hydraulic oil storage tank 19 by means of hydraulic line 38. Tank 19 is preferably mounted on the side walls of the hopper 4 in any suitable manner. The hydraulic system, more specifically discussed hereinbelow, comprises generally, in addition to the hydraulic pump 14, hydraulic motor 15, valve 16, selector valve 17, a second hydraulic motor 18, and hydraulic fluid lines leading therebetween.

Figure 2:
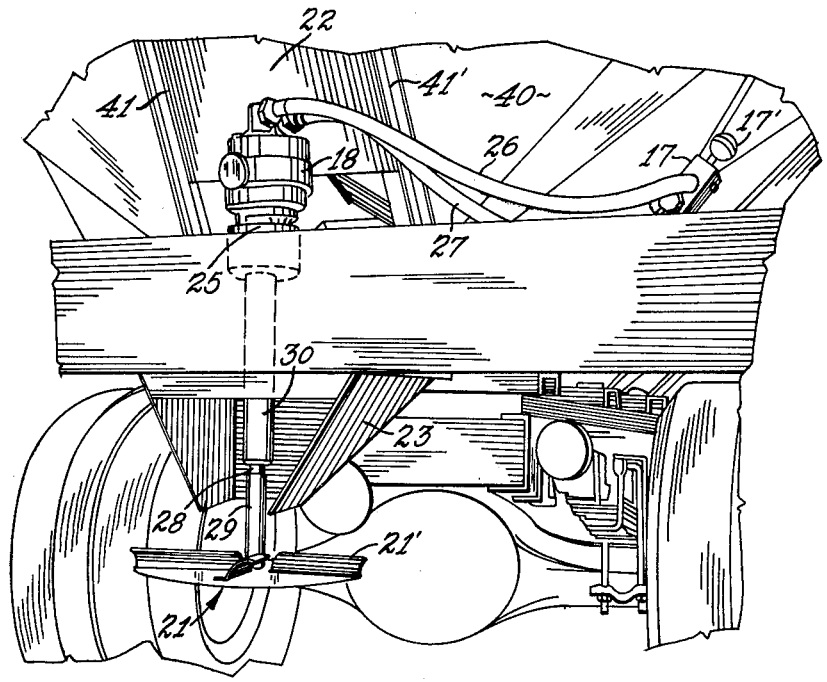
FIG. 2 is a rear elevation of the device of FIG. 1, taken on line 2—2 of FIG. 1.

In the FIG. 1 embodiment two spinner units 20 are mounted at the front portion of the truck and are adapted to spread sand in said region in a manner more specifically described in the aforesaid application. A spinner unit 21 in the FIG. 1 embodiment is mounted at the center rear of the spreading device and is adapted, when selectively operated by proper control mechanism, to alternately spread sand in the rear region. Spinners 20, as will be described more fully hereinbelow, are adapted to be driven by hydraulic motor 15, and rear spinner 21 is adapted to be driven by a separately mounted hydraulic motor 18 which, in the form shown in FIGS. 1 and 2, is secured to the rear housing 42 in any preferred manner, a drive shaft 23 extending vertically and downwardly therefrom. Chutes 109 and 109', FIG. 6, downwardly direct the sand onto the forwardly disposed spinners 20. Downwardly directed chute 23, FIG. 2, directs the sand to the rear mounted spinner unit 21.

It will be noted that spinner assemblies 20 and 21 are alternately operable, i.e., when the reversible conveyor 85 is conveying the sand forward spinners 20 will be in operation, and when the reversible conveyor 85 selectively conveys sand in a rearward direction spinners 20 will be inoperable and spinner 21 will be adapted to operate upon the operation of alternate valve mechanism, as will be more fully explained hereinbelow. The manner in which this operation is accomplished will be more fully described hereinafter with particular reference to FIG. 6.

The volume of sand delivered to the rear spinner unit 21 is controlled by means of adjustable gate 22.

Referring now to FIG. 2, a rear view of the FIG. 1 embodiment of my improved spreading device, adjustable gate 22 is positioned above conveyor 85 and is adapted to be raised or lowered in guide channels 41—41', which are positioned in parallel relationship on either side of the rectangular opening in the end wall. Thus by raising or lowering gate 22, the amount of sand conveyed to the rear spinner unit can be regulated. Positioned immediately below the opening in the end wall and at the rearward end of the conveyor is downwardly directed chute 23, which directs the sand to spinner unit 21.

By the proper positioning of selector valve 17, through means of valve control knob 17', hydraulic fluid is adapted to flow to hydraulic motor 18 in a manner to be explained more fully in particular reference to FIG. 6. Hydraulic motor 18 is adapted to drive shaft 28 through the media of gear box 25. Tubular sleeve 30 is formed integral with the gear box 25 and is adapted to rotatably receive shaft 28 and serves to vertically support said shaft. Tubular hub portion 29 is mounted on the lowermost portion of the drive shaft 28 in any suitable manner, such as, e.g., by means of a nut and bolt (not shown). The said tubular hub portion is affixed integrally to a circular mechanism 21 comprising a plurality of spinner vanes 21'. For the detailed construction of the spinning unit and the specific manner in which it is driven, attention is drawn to the aforesaid United States Letters Patent which specifically sets forth the arrangement.

Referring now to FIGS. 3 and 6, the hydraulic system of my improved spreading mechanism is illustrated therein, the system being shown in diagrammatic form in FIG. 6. Referring initially to FIG. 3, hydraulic motor 15, as stated previously, is mounted directly to engine 10 and is driven thereby. The hydraulic pump 14 is supplied with fluid from the tank 19 through a hydraulic line 38 secured at end to said tank and at an opposite end to said pump 14. The hydraulic fluid is pumped from the hydraulic pump 14 to valve means 16 located at one side of the hopper through line 33 connected to the pump at one end and to the valve 16 at an opposite end. From valve 16 the hydraulic fluid is adapted to go to any of three locations, depending on the setting of the valve 16. Referring now to FIG. 6, with the valve 16 in "reverse" position, designated as "R," as shown, the hydraulic fluid flows from valve 16 through line 35 to the hydraulic motor 15 and thence from said hydraulic motor 15 through line 36, selector valve 17, mounted to a side of the hopper rearwardly of said valve 16 to hydraulic motor 18 located at the rear of said hopper and is returned therefrom through a one-way valve 24 located adjacent the valve 17 and through a hydraulic line 37 back to the valve 16, completing the circuit. It will be understood that when the valve 16 is in the reverse position, suitable control means located in the cab (not shown) is used to disengage the gear box 106 from reduction gear box 105, thus rendering the front spinner assemblies 20 temporarily inoperative.

When valve 16 is placed in a neutral position, designated at "N," by operation of the valve handle 111 the hydraulic fluid is pumped from the pump 14 through the valve 16 directly back to the fluid tank 19 through a hydraulic line 34. It will be noted that neither the hydraulic motor 15 nor motor 18 are operating in the neutral position.

It will be noted that the valve 16, in operation, merely controls the direction of the hydraulic motor 15 and consequently the direction of the reversible conveyor 85. Thus, when valve 16 is set in a reverse position, hydraulic motor 15, through the media of shaft 104, reduction gear box 105 and shaft 110 drives the reversible conveyor 85 in a reverse or rearward direction. When valve 16 is thus positioned in the reverse position by means of the control handle 111, the hydraulic motor 18, positioned at the rear of the truck, is placed in series flow arrangement only if valve 17 is so pre-set.

When the valve 17 is placed in an open flow position by means of the operator positioning the valve control 17', the fluid will flow therethrough to the hydraulic motor 18 to operate the spinner 21 and the fluid will return through the one-way valve 24 and line 37 to valve 16. If the selector valve 17 is placed in closed position by the operator the hydraulic fluid will flow through valve 17 and will be returned to line 37 through branch line 71 and one-way valve 24, thus bypassing hydraulic motor 18. It will thus be seen that the selector valve 17, as diagrammatically illustrated in FIG. 6 is of Y-type construction, capable of permitting flow alternately through either branch to either operate the rearwardly disposed spinner means or to be rendered inoperable for that purpose.

When the operator, through the means of handle 111 places the valve 16 in a forward or "F" position, hydraulic fluid will flow through line 37, line 71, selector valve 17, hydraulic line 36, hydraulic motor 15 and will be exhausted therefrom through line 35 back into the selector valve 16. In the forward cycle the reversible conveyor 85 will be operated in a forward direction and power for operating the spinner units will be transmitted from hydraulic motor 15 through shaft 104, reduction gear box 105, and transfer gear box 106 to spinner gear boxes 107 and 107', thus operating the forward spinners 20. Transfer gear box 106 transmits power to the spinner gear boxes 107 and 107' through the means of shaft 108. When in this forward operating position sand will be conveyed forward by the conveyor 85 and will be directed downwardly into chutes 109, 109' which in turn direct the sand onto spinner units 20. It will be understood that when the valve 16 is placed in a forward position, selector valve 17 will be correspondingly closed so as to preclude the passage of hydraulic fluid from line 37 to one-way valve 24 and line 71 to hydraulic motor 18. The structure of the one-way valve 24 is of a conventional nature.

Referring now to FIGS. 4, 5, 7, and 8, an embodiment of my invention is illustrated therein, in which embodiment the spinner mechanism mounted at the rear of the truck is optionally mounted at either side of the rear portion of the spreader instead of in the center thereof as in the FIGS. 1 and 2 embodiment. Although the spinner unit 21' in FIGS. 4, 5, 7, and 8 is shown mounted on the left rear side of the spreading device, it will be apparent that it could be mounted on the right hand side thereof as well. Referring now to FIG. 4, rear housing 42 is mounted on the rear portion of the truck frame and preferably comprises a horizontal ledge member 43 and a vertical member 44. The vertical member 44, in the form shown herein, is provided with an inwardly directed perpendicular flange 44a. A trough 50, more clearly shown in FIG. 9, is adapted to be mounted on the flange 44a of the rear housing and a similar horizontally disposed laterally spaced parallel flange 44b, both of said flanges being secured to the truck frame. The trough 50 underlies the gate 22 and is disposed from side to side of the frame, being substantially of greater lateral extent than the reversible conveyor 85, extending transversely to the left thereof, as viewed in FIG. 4, and terminating immediately above spinner assembly 21', which is similar to spinner assembly 21 of the FIG. 1 embodiment. A helicoidal flight conveyor 53 is positioned centrally of the trough 50 and comprises a conveyor shaft 54 and auger elements 55 integral with the shaft 54 which are adapted, when rotating, to convey the sand from the main conveyor to spinner assembly 21'.

Figure 8:
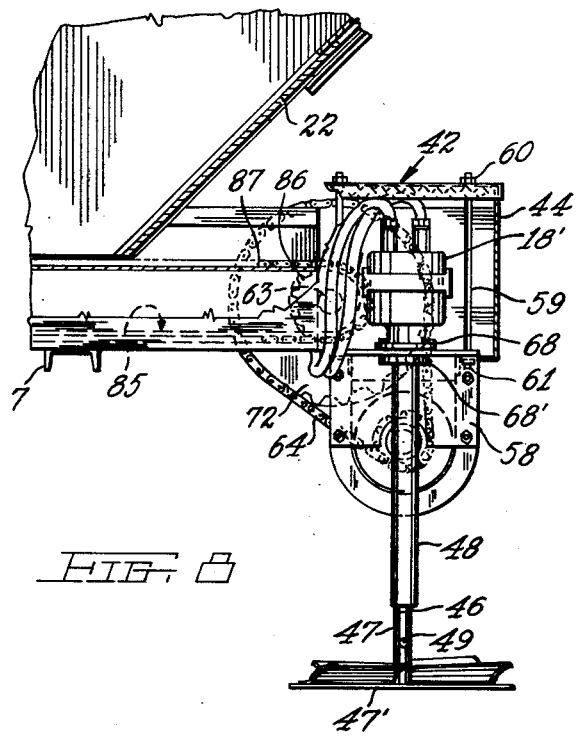
FIG. 8 is a side elevational view of the embodiment of my invention employing a helicoid flight conveyor, and is taken on line 8—8 of FIG. 5.
Figure 9:
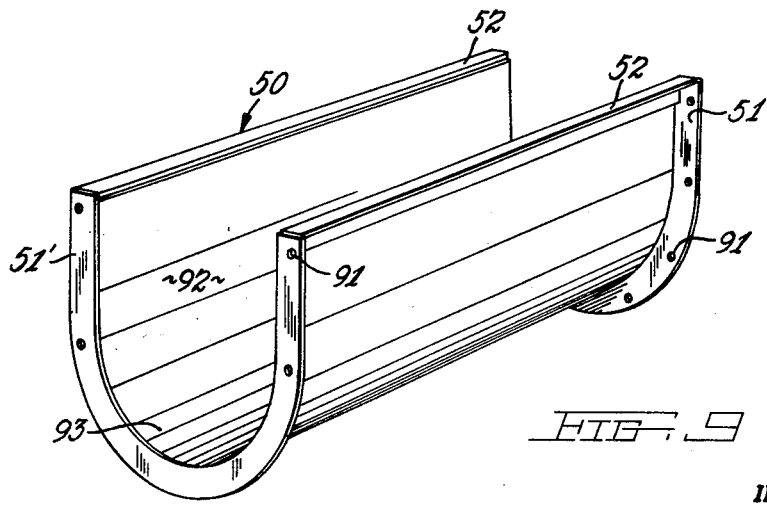
FIG. 9 is a view showing more specifically the flanged trough which houses the helicoid flight conveyor of an embodiment of my improved spreading mechanism.

As will be seen in FIGS. 5 and 8, helicoid conveyor shaft 54 is adapted to be rotated by existing power, namely hydraulic motor 15. The reversible conveyor 85, driven by the drive shaft 110, rotates a rear driven shaft 63 through sprocket means 86 and conveyor chain 87, in a well known manner. The driven shaft 63 is provided with a sprocket 62, as seen in FIGS. 4, 5, and 8. The sprocket chain 64 is mounted on the sprocket 62, the chains 64 being also mounted for movement around a sprocket 65 keyed to the auger shaft 54, as more clearly seen in FIGS. 4 and 5 by means of an annular ring 80 which is fixed to the sprocket 65 and a key 81 secures the shaft 54 for rotation with the ring 80. Sprocket 62 is keyed to the shaft 63 through means of an annular ring 73, fixed to the sprocket 62, and key 74, which secures the ring 73 to the shaft 63. Thus it will be seen that, when the shaft 63 is driven by hydraulic motor 15, the sprocket 62 will be caused to rotate thus rotating sprocket 65 and shaft 54 to drive the auger and convey sand or other material dispensed through the gate 22 to the trough 50 to the open end 50' of the auger, which, in the form shown, is disposed above the spinner 21'. While it will be apparent that the sprocket 62 and sprocket 65 may be proportionately related in any predetermined manner, depending on the desired auger speed, it has been found that highly satisfactory results have ensued where the tooth ratio between sprockets 62 and 65 is 5 to 1, respectively.

Vertical flange 51 of trough 50 is secured to a vertical endplate 77, FIG. 5, through securing means 78. Mounted on the trough endplate 77 is a bearing support 76, which supports the shaft bearing 56 in the right end portion of trough 50. Bearing support 76 may be secured to endplate 77 in any well known manner such as, e.g., by means of securing nuts 79.

Mounted preferably on the left rear side of rear housing 42 is the spinner mechanism 21'. Helical flight conveyor shaft 54 is supported in the left side of trough 50, looking in the direction of FIG. 4, by means of a hanger support 57 secured to the trough which serves to properly position the shaft 54 in the trough 50. The left end of trough 50 is further supported relative to the rear housing 42 by means of an L-shaped flange 58 secured to the rear housing 42 by pin means 59 secured to vertical flange 51' of the trough 50. Pins 59 are secured to the flange 58 by means of nuts 61 and to the housing by fastening means 60.

The additional spinner assembly 21', including hydraulic motor 18', is fixedly mounted at the left side of rear housing 42 by means of collar members 68, 68' which are mounted on either side of flange 58 to rigidly secure the motor and spinner mechanism to the frame and against vibration. The gear box 45, in the form illustrated herein, is mounted directly below the hydraulic motor 18' and the spinner shaft 46 extends vertically downwardly from the said gear box 45 to drive the disc type spinner mechanism 21'. A pin 49 secures the spinner tubular hub portion 47 to the rotating shaft 46. A tubular sleeve 48 is telescoped over the shaft 46 secured to L-shaped bracket 58 and also extends vertically downwardly from the gearbox 45 and serves to rotatably support the shaft 46.

Referring now to FIGS. 4, 5, and 6, the hydraulic motor 18' is adapted to be driven by hydraulic fluid flowing thereto through the line 26 and is exhausted therefrom through the line 27. Noting FIG. 6, when the valve 16 is in a reverse, or "R" position, the hydraulic motor 15 will drive the reduction gear box 105 which in turn drives the shaft 110, operating the reversible conveyor in a reverse direction. The reversible conveyor 85 is driving through a conveyor belt or chain 87, to drive a rear transversely mounted shaft 63 by a sprocket drive mechanism adapted to drive a rear drive shaft 54 mounted below the shaft 63 and extending transversely of the frame and rearwardly thereof. Sand is thus delivered to the outer end of the trough 50 and dispensed downwardly onto the spinner 21'. At the same time, when the selector valve 17 is in an open position, hydraulic fluid will be caused to flow to the hydraulic motor 18' through line 36 and valve 17, to rotate the spinner mechanism.

When it is desired to perform merely a windrowing operation, the rear spinner assembly 21' is removed, the same being detachable, as shown, from the rear housing 42. When the spinner mechanism 41' is removed, as described, the sand conveyed to the open end of the trough 50 will emanate from the outer end thereof and fall freely and uninterruptedly to the ground and, as shown, at one side of the road.

As noted previously, the trough 50, helicoid conveyor 53, and spinner assembly 21', can, by transposition of the drive mechanism and open end, be mounted without difficulty so as to feed and dispense the sand at the right rear portion of the truck instead of at the left rear portion, as shown.

Figure 7:
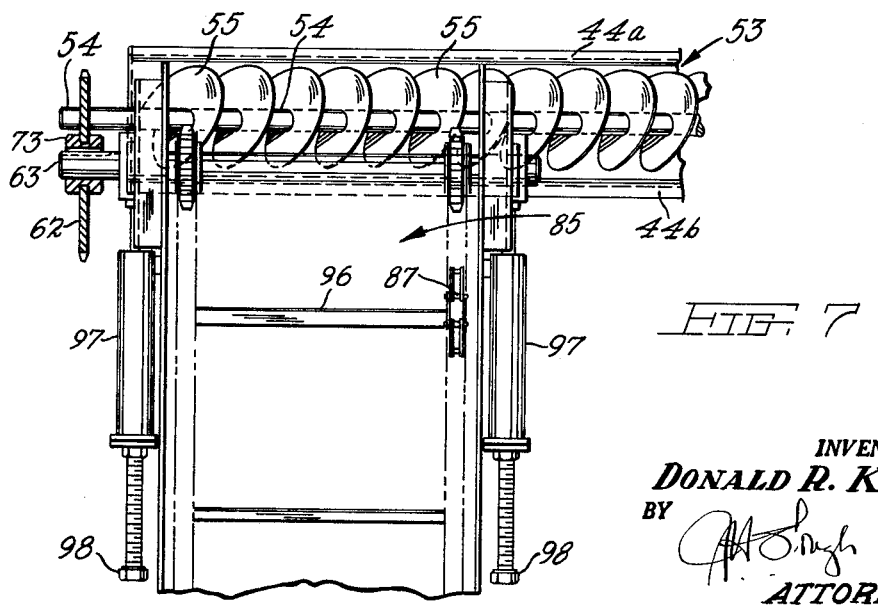
FIG. 7 is a plan view of the rear portion of the embodiment of my improved spreading mechanism employing a helicoid flight conveyor.

Referring now to FIG. 7, a plan view which shows the relationship between the longitudinal reversible conveyor and the transversely positioned helicoid flight conveyor, the reversible conveyor 85 is shown provided with vertically positioned transverse bars or scrapers 96 which extend upwardly and engage the sand, thus positively moving the sand either forwardly or rearwardly depending upon the direction in which the conveyor is rotating. Reversible conveyor 85 is provided with take-up assemblies 97 at either side thereof so as to maintain the conveyor 85 in a pre-determined degree of tightness. The take-up assemblies 97 are preferably adjustable through the means of bolts 98. The rearward end of the conveyor 85 terminates immediately above the helicoid flight conveyor 53, the sand thus being conveyed uninterruptedly from the bottom of the hopper through the gate 22 at the rear of the hopper and the helicoidal conveyor to the spinner assembly 21a.

Referring now to FIG. 9, there is therein illustrated the trough structure herein described. The trough 50 comprises horizontal longitudinally disposed flanges 52 at the upper end thereof for securing the trough to rear housing 42 as previously noted, and provided with vertical arcuate flanges 51 and 51' secured to the end portions of trough 50 to provide means for securing the trough to the rear housing and also enable end plate 77 to be secured to the trough 50. Apertures 91 are provided in flanges 51 and 51' for accommodating suitable securing means. Downwardly converging side walls 92 terminate in an arcuate bottom wall 93 for receiving the helicoid flight conveyor in spaced relation thereto.

The operation should be apparent from the above description, but for purposes of clarity, will be further described as follows:

When it is desired to dispense only from the front spinners 20, the valve 16 will be placed in a forward or "F" position by means of the handle 111. The hydraulic motor 15 will then operate the motor shaft 104, gear box 105, and shaft 110 to rotate the conveyor 85 in a forward direction. Further, the spinner motors 107, 107' will be rotated through the medium of the shaft 108 and the transfer gear box 106 and will function to rotate the spinners 20, thus spreading the sand delivered thereto through the chutes 109 and 109'. In this forward position the selector valve 17 will be closed thus precluding fluid flow to the hydraulic motors 18 or 18', depending on where the rear spinner assembly is located.

When it is desired to operate the rear spinner 21', valve 16, through the control handle 111, is placed in a reverse or "R" position and the valve 17 is opened by means of valve control knob 17'. This will reverse the direction of the hydraulic motor 15 which will subsequently reverse the direction of the conveyor 85. In such reverse position of the valve 16, hydraulic fluid will flow through the line 36 and the selector valve 17 to the hydraulic motor 18 or 18' to operate either the spinner 21 or 21', respectively. The exhausted hydraulic fluid will flow back to the selector valve 16 through the one-way valve 24 in line 37. When it is desired to employ the helicoidal conveyor either in conjunction with the rearwardly disposed spinner 21' or in a windrowing operation, it will be noted that this is accomplished through a direct drive from the motor 15.

It will thus be seen that applicant has accomplished the objects of the invention. A more flexible and efficient sand-spreading operation has been accomplished through the provision of an additional sand-dispensing mechanism positioned at the rear of the truck. Sand can be dispensed alternately from either the front or the rear of the spreader, thus eliminating any necessity for reversing the spreader device on the truck bed or relocating the spinner devices, or the motive means therefor.

Further, this additional sand-dispensing mechanism operates through the existing power sources of the forward sand-dispensing spinners, thus precluding any problems connected with having to increase or add a power source for operating the rear material spreading device.

Further, the additional rear-mounted sand dispenser of this invention is highly flexible, providing a spreader that can be mounted in any desired location at the rear of the truck. Also, the rear mounted spinner assemblies are adapted to be readily removed for windrowing operations, if desired, which can be achieved through means mounted rearwardly of the truck and operated by the same power source used for operating the front spinner mechanisms.

Uninterrupted flow of sand from the hopper to the rear mounted spinner assembly, wherever located, has been insured through the provision of a helicoid flight conveyor, also adapted to be operated by the existing power source.

It will be understood that numerous changes may be made in my invention, such as changes in size and dimension, without departing from the spirit thereof or the scope of the appended claims.

What I claim is:

1. In a sand spreader for a vehicle, comprising an open bottom hopper for storing a supply of sand, a prime mover independent of the engine means for propelling the said vehicle mounted adjacent the said sand spreader, a reversible conveyor mounted longitudinally beneath said hopper, rotary spinner means mounted at the front of said spreader and disposed below the front end of said conveyor to dispense sand conveyed thereto by said conveyor, rotary spinner means mounted at the rear of said spreader to dispense sand conveyed thereto by said conveyor, said prime mover driving a first hydraulic motor associated therewith, said first hydraulic motor driving the said conveyor in a rearward direction, a second hydraulic motor associated with said rear mounted spinner means, valve means being selectively positioned whereby power delivered from said prime mover to said first hydraulic motor is delivered to said second hydraulic motor rotating said rear mounted spinner means when the conveyor is driven in the rearmost direction, said valve means also being selectively positioned to render the rear mounted spinners inoperable when the conveyor is driven in a forward direction and the spinner means mounted at the front of said spreader are rotated by said first hydraulic motor driven by said prime mover.

2. In a sand spreader for a vehicle comprising an open bottomed hopper for storing a supply of sand, a prime mover independent of the engine means for propelling the said vehicle mounted adjacent the sand spreader, a reversible conveyor mounted longitudinally beneath said hopper, a plurality of rotary spinners mounted at the front of said spreader and disposed below the front end of said conveyor to dispense sand conveyed thereto by said conveyor, a second trough-shaped conveying means located in the rear of said spreader adjacent the end of said first longitudinally extending conveyor and extending transversely thereto, said second conveying means having a helicoidal flight conveyor disposed therein driven by said prime mover and adapted to convey sand from said first conveyor to a side thereof, dispensing the same through an opening at one side thereof, hydraulic means driven by said prime mover operative in one direction to drive said reversible conveyor in a forward direction and to rotate said rotary spinners and alternately operative in a second condition to drive said reversible conveyor in a rearward direction while driving said flight conveyor to dispense sand to said side.

3. In a sand spreader for a vehicle comprising an open bottomed hopper for storing a supply of sand, a prime mover independent of the engine means for propelling the said vehicle mounted adjacent the sand spreader, a hydraulic motor driven by said prime mover, a reversible conveyor mounted longitudinally beneath said hopper, said hydraulic motor driving the conveyor in either forward or rearward direction, a plurality of rotary spinners mounted at the front of said spreader and disposed below the front end of said conveyor adapted to be driven by said hydraulic motor to dispense sand conveyed thereto by said conveyor, a second conveyor means comprising a trough located at the rear of said spreader adjacent the end of said first longitudinally extending conveyor and extending transversely thereto, said trough having a helicoidal flight conveyor disposed therein, power transmission means connecting said reversible conveyor and said flight conveyor whereby said flight conveyor is driven by said prime mover and said hydraulic motor to convey sand from said reversible conveyor to a side thereof to dispense the same at an opening in the side thereof when the reversible conveyor is driven in a rearward direction, a rotary spinner mounted at the rear of said spreader and at one side of and beneath said flight conveyor, a separate hydraulic motor adjacent to and driving said rear spinner and selective valve means positionable to power said separate hydraulic motor to rotate said rear spinner to dispense sand delivered thereto by said flight conveyor, when the reversible conveyor is driven in a rearward direction.

References Cited in the file of this patent

UNITED STATES PATENTS

| 2,368,470 | Hopkins | Jan. 30, 1945 |
| 2,393,849 | Werts | Jan. 29, 1946 |
| 2,421,211 | Lutz | May 27, 1947 |
| 2,484,325 | Watcher | Oct. 11, 1949 |
| 2,614,849 | Holben | Oct. 21, 1952 |
| 2,697,609 | Chase et al. | Dec. 21, 1954 |
| 2,799,510 | Schmidt | July 16, 1957 |
| 2,967,056 | D'Amato | Jan. 3, 1961 |
| 2,970,710 | Jensen | Feb. 7, 1961 |
| 2,988,368 | Kerr | June 13, 1961 |
| 3,010,727 | Swenson et al. | Nov. 28, 1961 |
| 3,019,025 | Young | Jan. 30, 1962 |